US008283402B2

(12) United States Patent
Slay et al.

(10) Patent No.: US 8,283,402 B2
(45) Date of Patent: *Oct. 9, 2012

(54) DOWNHOLE SEAL ELEMENT FORMED FROM A NANOCOMPOSITE MATERIAL

(75) Inventors: Jeremy Buc Slay, Ft. Worth, TX (US); Thomas Wayne Ray, Tyler, TX (US)

(73) Assignee: Halliburton Energy Services, Inc., Houston, TX (US)

(*) Notice: Subject to any disclaimer, the term of this patent is extended or adjusted under 35 U.S.C. 154(b) by 367 days.

This patent is subject to a terminal disclaimer.

(21) Appl. No.: 12/706,439

(22) Filed: Feb. 16, 2010

(65) Prior Publication Data

US 2010/0181729 A1 Jul. 22, 2010

Related U.S. Application Data

(60) Continuation of application No. 11/810,323, filed on Jun. 5, 2007, now Pat. No. 7,696,275, which is a division of application No. 10/717,814, filed on Nov. 20, 2003, now abandoned.

(51) Int. Cl.
*C08K 3/04* (2006.01)
(52) U.S. Cl. .................. 524/495; 524/496
(58) Field of Classification Search .......... 524/495, 524/496
See application file for complete search history.

(56) References Cited

U.S. PATENT DOCUMENTS

| | | |
|---|---|---|
| 3,879,044 A | 4/1975 | Estes |
| 4,761,447 A | 8/1988 | Shen et al. |
| 4,773,834 A | 9/1988 | Saruwatari |
| 4,818,197 A | 4/1989 | Mueller |
| 4,839,221 A | 6/1989 | Asumi et al. |
| 4,851,068 A | 7/1989 | Uyehara |
| 5,134,170 A | 7/1992 | Ohata et al. |
| 5,169,887 A | 12/1992 | Snow et al. |
| 5,205,972 A | 4/1993 | Kafka |
| 5,323,863 A | 6/1994 | Denton |
| 5,385,984 A | 1/1995 | Blohm et al. |
| 5,459,202 A | 10/1995 | Martinez et al. |
| 5,474,432 A | 12/1995 | Hulley et al. |
| 5,552,469 A | 9/1996 | Beall et al. |
| 5,524,718 A | 11/1996 | Kirk et al. |
| 5,578,672 A | 11/1996 | Beall et al. |
| 5,668,203 A | 9/1997 | Badesha et al. |
| 5,698,624 A | 12/1997 | Beall et al. |
| 5,721,306 A | 2/1998 | Tsipursky et al. |
| 5,759,019 A | 6/1998 | Wood et al. |
| 5,760,121 A | 6/1998 | Beal et al. |
| 5,804,613 A | 9/1998 | Bell et al. |
| 5,830,528 A | 11/1998 | Beal et al. |
| 5,840,796 A | 11/1998 | Badesha et al. |
| 5,844,032 A | 12/1998 | Serrano et al. |
| 5,849,830 A | 12/1998 | Tsipursky et al. |
| 5,877,248 A | 3/1999 | Beal et al. |
| 5,880,197 A | 3/1999 | Beall et al. |
| 5,952,095 A | 9/1999 | Beall et al. |
| 5,962,553 A | 10/1999 | Ellsworth |
| RE36,452 E | 12/1999 | Upton et al. |
| 5,998,528 A | 12/1999 | Tsipursky et al. |
| 6,034,164 A | 3/2000 | Elspass et al. |
| 6,050,509 A | 4/2000 | Clarey et al. |
| 6,057,396 A | 5/2000 | Lan et al. |
| 6,083,559 A | 7/2000 | Beall et al. |
| 6,090,734 A | 7/2000 | Tsipursky et al. |
| 6,107,387 A | 8/2000 | Kaylo et al. |
| 6,123,337 A | 9/2000 | Fang et al. |
| 6,124,365 A | 9/2000 | Lan et al. |
| 6,126,734 A | 10/2000 | Beall et al. |
| 6,183,226 B1 | 2/2001 | Wood et al. |
| 6,225,394 B1 | 5/2001 | Lan et al. |
| 6,228,903 B1 | 5/2001 | Beall et al. |
| 6,232,388 B1 | 5/2001 | Lan et al. |
| 6,235,533 B1 | 5/2001 | Tsipursky et al. |
| 6,242,500 B1 | 6/2001 | Lan et al. |
| 6,251,980 B1 | 6/2001 | Lan et al. |
| 6,262,162 B1 | 7/2001 | Lan et al. |
| 6,336,796 B1 | 1/2002 | Cholet et al. |
| 6,362,279 B2 | 3/2002 | Lichtenhan et al. |
| 6,376,591 B1 | 4/2002 | Lan et al. |
| 6,387,996 B1 | 5/2002 | Lan et al. |
| 6,391,449 B1 | 5/2002 | Lan et al. |
| 6,399,690 B2 | 6/2002 | Lan et al. |
| 6,407,155 B1 | 6/2002 | Qian et al. |

(Continued)

FOREIGN PATENT DOCUMENTS

CN 1289812 4/2001

(Continued)

OTHER PUBLICATIONS

Leland Vane; "Membrane Technology"; POSS Nanotechnology Conference 2002; Sep. 2002; 1 page.
Jack Sammons; "Gas Permeability & Gas Separation using POSS Materials"; POSS Nanotechnology Conference 2002; Sep. 2002; 1 page.
Rene Gonzalez; "POSS Research Efforts with AFRL"; POSS Nanotechnology Conference 2002; Sep. 2002; 1 page.
Jeffrey Gilman; "Development of High Throughput Methods for Nanocomposite Materials Research"; POSS Nanotechnology Conference 2002; Sep. 2002; 1 page.
Andre Lee; "Applications of POSS in Thermosetting Polymers and Composites"; POSS Nanotechnology Conference 2002; Sep. 2002; 1 page.
M. Azam Ali et al.; "Nanocomposite resists for Next Generation Lithography (NGL)"; POSS Nanotechnology Conference 2002; Sep. 2002; 1 page.

(Continued)

*Primary Examiner* — Edward Cain
(74) *Attorney, Agent, or Firm* — Lawrence R. Youst

(57) ABSTRACT

A seal element (70) for providing a static or dynamic seal between two components (74, 78) in a downhole tool includes a polymer host material (212) and a plurality of nanostructures (220) forming a nanocomposite material (210). The polymer host material (212) has a plurality of regions of free volume (222) that receive the nanostructures (220). The nanostructures (220) and the polymer host material (212) form interfacial interactions that improve the useful life of the seal element (70) by minimizing seal failures associated with explosive decompression, extrusion, spiral failure, abrasion, temperature degradation and the like.

25 Claims, 6 Drawing Sheets

U.S. PATENT DOCUMENTS

| | | | |
|---|---|---|---|
| 6,461,423 | B1 | 10/2002 | Beall et al. |
| 6,462,122 | B1 | 10/2002 | Qian et al. |
| 6,481,494 | B1 | 11/2002 | Dusterhoft et al. |
| 6,540,022 | B2 | 4/2003 | Dusterhoft et al. |
| 6,554,070 | B2 | 4/2003 | Chavez et al. |
| 6,680,016 | B2 | 1/2004 | Wang et al. |
| 6,716,919 | B2 | 4/2004 | Lichtenhan et al. |
| 6,737,478 | B2 | 5/2004 | Obrecht et al. |
| 6,746,627 | B2 | 6/2004 | Niu et al. |
| 6,759,463 | B2 | 7/2004 | Lorah et al. |
| 6,828,015 | B2 | 12/2004 | Hirata et al. |
| 6,872,061 | B2 | 3/2005 | Lemay et al. |
| 6,881,045 | B2 | 4/2005 | Zitka et al. |
| 6,914,095 | B2 | 7/2005 | Lorah et al. |
| 6,998,434 | B2 | 2/2006 | Wadahara et al. |
| 7,005,550 | B1 | 2/2006 | Tan et al. |
| 7,013,998 | B2 | 3/2006 | Ray et al. |
| 7,055,629 | B2 | 6/2006 | Oglesby |
| 7,056,455 | B2 | 6/2006 | Matyjaszewski et al. |
| 7,211,368 | B2 | 5/2007 | Coats et al. |
| RE40,197 | E | 4/2008 | Ray et al. |
| 7,696,275 | B2 * | 4/2010 | Slay et al. .......... 524/496 |
| 2005/0109502 | A1 | 5/2005 | Buc Slay et al. |
| 2005/0161212 | A1 | 7/2005 | Leismer et al. |
| 2009/0038858 | A1 | 2/2009 | Griffo et al. |

FOREIGN PATENT DOCUMENTS

| | | |
|---|---|---|
| DE | 10059237 | 6/2002 |
| EP | 1211282 | 6/2002 |
| EP | 1533468 | 11/2004 |
| EP | 1533469 | 11/2004 |
| JP | 11293089 | 10/1999 |
| JP | 2001158849 | 6/2001 |
| JP | 2004075707 | 3/2004 |
| JP | 2004132486 | 4/2004 |
| JP | 2004148634 | 5/2004 |
| WO | 9810012 | 3/1998 |
| WO | 02079308 | 10/2002 |
| WO | 03072646 | 9/2003 |
| WO | 2005014708 | 6/2004 |

OTHER PUBLICATIONS

Lucie Robitaille et al.; "POSS Technology for Improved Adhesives in Telecommunications Applications"; POSS Nanotechnology Conference 2002; Sep. 2002; 1 page.
David A. Schiraldi et al.; "Reinforcement of PET with POSS"; POSS Nanotechnology Conference 2002; Sep. 2002; 1 page.
Masanori Ikeda; "Utilization of POSS in Industrial Applications"; POSS Nanotechnology Conference 2002; Sep. 2002; 1 page.
Gregg Zank; "The Chemistry of Hydrogen-octasilsesquioxane: The Preparation of Chracterization of Octasilsesquioxane Containing Polymers"; POSS Nanotechnology Conference 2002; Sep. 2002; 1 page.
Richard Laine et al.; "Silsesquloxane Nanocomposites and Phenylsilsesquioxane Derivatives"; POSS Nanotechnology Conference 2002; Sep. 2002; 1 page.
Bryan Coughlin; "POSS—Polyolefin Nanocomposites"; POSS Nanotechnology Conference 2002; Sep. 2002; 1 page.
Charles U. Pittman, Jr.; "Chemical Incorporation of POSS Derivatives into Crosslinked Polymer Matrices"; POSS Nanotechnology Conference 2002; Sep. 2002; 1 page.
Rusty Blanski; "Synthesis and Characterization of Lubricants Based on POSS Technology"; POSS Nanotechnology Conference 2002; Sep. 2002; 1 page.
Mark Banasak-Holl; "POSS Surface Science and Applications to Non-Linear Electronic Devices"; POSS Nanotechnology Conference 2002; Sep. 2002; 1 page.
Scott Schricker et al.; "POSS in Dental Composites and Adhesives"; POSS Nanotechnology Conference 2002, Sep. 2002; 1 page.
Patrick Mather; "Amphiphilic POSS Telechelics"; POSS Nanotechnology Conference 2002; Sep. 2002; 1 page.
Alan Esker; "Interfacial Properties of Amphiphillic POSS derivatives"; POSS Nanotechnology Conference 2002; Sep. 2002; 1 page.
Adam Strachota; "POSS Reinforced Epoxy Systems"; POSS Nanotechnology Conference 2002; Sep. 2002; 1 page.
V. Bellas et al.;"First Results on the Lithographic Evaluation of new POSS Containing 157nm Photoresists"; POSS Nanotechnology Conference 2002; Sep. 2002; 6 pages.
Junchao Huang et al.; "Preparation and Properties of Polyimide-POSS Nanocomposites"; POSS Nanotechnology Conference 2002; Sep. 2002; 6 pages.
Guirong Pan et al.; "Combining POSS with Dendrimers and High-Performance Thermoplastics"; POSS Nanotechnology Conference 2002; Sep. 2002; 11 pages.
Patrick Ruth; "Effects on Processing by Drop-in Modifers in Nano-Composite Polymers"; POSS Nanotechnology Conference 2002; Sep. 2002; 10 pages.
Brian Moore et al.; "POSS Polystyrene Copolymers Reactivity and Control"; POSS Nanotechnology Conference 2002; Sep. 2002; 12 pages.
Michael T. Hay et al.; "Synthesis and Characterization of a Novel Iron (III) Silsesquioxane Compound"; POSS Nanotechnology Conference 2002; Sep. 2002; 6 pages.
Joseph Lichtenhan; "Introduction and Welcome"; POSS Nanotechnology Conference 2002; Sep. 2002; 2 pages.
Donald Bansleben; "Nanostructured Materials: Commercial Applications and Horizons"; POSS Nanotechnology Conference 2002; Sep. 2002; 15 pages.
Rohit Shukla: "California's Nanotechnology Republic"; POSS Nanotechnology Conference 2002; Sep. 2002; 8 pages.
Shashi Jasty; "R&D Markets for POSS Nanomaterials"; POSS Nanotechnology Conference 2002; Sep. 2002; 13 pages.
Shawn Phillips; "AFRL POSS Nanomaterials"; POSS Nanotechnology Conference 2002; Sep. 2002; 20 pages.
Baudilio Tejerina; "POSS—Versatile Materials for Scientific & Technological Applications"; POSS Nanotechnology Conference 2002; Sep. 2002; 14 pages.
John Kieffer; "Multiscale Simulation of POSS Nano-Assembly"; POSS Nanotechnology Conference 2002; Sep. 2002; 19 pages.
Erik Abbenhuis; "Homogeneous and Heterogeneous Catalysis with POSS"; POSS Nanotechnology Conference 2002; Sep. 2002; 17 pages.
Stephanie L. Wunder; "POSS Materials as Platforms for Synthesis of Novel Electrolytes for Lithium Batteries"; POSS Nanotechnology Conference 2002; Sep. 2002; 22 pages.
Leland Vane; "Membrane Technology"; POSS Nanotechnology Conference 2002; Sep. 2002; 13 pages.
Jack Sammons; "Gas Permeability & Gas Separation Using POSS Materials"; POSS Nanotechnology Conference 2002; Sep. 2002; 9 pages.
Rene Gonzalez; "POSS Research Efforts within AFRL"; POSS Nanotechnology Conference 2002; Sep. 2002; 24 pages.
Jeffrey Gilman; "Development of High Throughput Methods for Nanocomposite Materials Research"; POSS Nanotechnology Conference 2002; Sep. 2002; 24 pages.
Andre Lee; "Applications of POSS in Thermosetting Polymers and Composites"; POSS Nanotechnology Conference 2002; Sep. 2002; 23 pages.
M. Azam Ali et al.; "Nanocomposite Resists for NGL"; POSS Nanotechnology Conference 2002; Sep. 2002; 20 pages.
Lucie Robitaille; "POSS Nanotechnology for Improved Adhesives in Telecommunications Applications"; POSS Nanotechnology Conference 2002; Sep. 2002; 18 pages.
David A. Schiraldi; "Reinforcement of PET with POSS"; POSS Nanotechnology Conference 2002; Sep. 2002; 14 pages.
Masanori Ikeda; "Utilization of POSS in Industrial Applications"; POSS Nanotechnology Conference 2002; Sep. 2022; 11 pages.
Gregg Zank; "The Chemistry of Hydrogen-octasilsesquioxane: The Preparation and Characterization of Octasilsesquioxane Containing Polymers"; POSS Nanotechnology Conference 2002; Sep. 2002; 18 pages.
Richard Laine; "Silsesquioxane Nanocomposites and Phenylsilsesquioxane Derivatives"; POSS Nanotechnology Conference 2002; Sep. 2002; 19 pages.
Bryan Coughlin; "POSS—Plyolefin Nanocomposites"; POSS Nanotechnology Conference 2002; Sep. 2002; 22 pages.

Chares U. Pittman, Jr. Chemical Incorporation of POSS Derivatives into Crosslinked Polymer Matrices; POSS Nanotechnology Conference 2022; Sep. 2002; 23 pages.
Rusty Blanski; "The Synthesis and Characterization of Lubricants Based on POSS Technology"; POSS Nanotechnology Conference 2002; Sep. 2002; 19 pages.
Mark Banasak-Holl; "POSS Surface Science and Applications to Non-Linear Electronic Devices"; POSS Nanotechnology Conference 2002; Sep. 2002; 20 pages.
Scott Schricker; "POSS in Dental Composites and Adhesives"; POSS Nanotechnology Conference 2002; Sep. 2002; 19 pages.
Patrick Mather; "Amphiphillic POSS Telechelics"; POSS Nanotechnology Conference 2022; Sep. 2002; 27 pages.
Alan Esker; "Interfacial Properties of Amphiphilic POSS Derivatives"; POSS Nanotechnology Conference 2002; Sep. 2002; 15 pages.
Adam Strachota; "POSS Reinforced Epoxy Systems"; POSS Nanotechnology Conference 2002; Sep. 2002.
Richard Laine et al.; "Panel Discussion"; POSS Nanotechnology Conference 2022; Sep. 2002; 8 pages.
European Patent Office (EP 1 533 468 A1); European Search Report; Application No. 04 25 7097; Feb. 23, 2005; (pp. 14-16).
MacFarlane; "How seawater, temperature, pressure degrade polymeric materials"; Materials Science/Engineering; Offshore—www.offshore-mag.com; Dec. 2000; 2 pages.
Sanvito, G.; "Peroxide Vulanised Periluoroelastomers"; Macplas; 27; No. 235; ISSN: 0394-3453; Jan./Feb. 2002; pp. 108-110.
"Oilfield Engineering with Polymers Conference" 4th MERL Conference, London, UK; Rapra Technology Ltd & MERL Limited; Nov. 3-4, 2003; pp. 248-258.
Zinc Corporation of America ZCA. KADOX-911, Mar. 2001, (Zinc Oxide). http://www.thecarycompany.com/adobe/ZCA/kadox911-data.pdf.
Ciullo, P.A. (1996). Industrial Minerals and Their Uses—A Handbook and Formulary. (pp. 221-222, 231-235). William Andrew Publishing/Noyes.Online version available at: http://www.knovel.com/knovel2/Toc.jsp?BookID=389&VerticalID=O.
EPO Abstract and computer translation for DE 10059237 (May 20, 2002).
European Patent Office (EP 1 533 469 Al); European Search Report; Application No. EP 04 25 7087; Feb. 14, 2005 (p. 17).
Buc Slay et al.; "What Engineers Need to Know About Seals and Sealing Technology"; Energy Rubber Group—2003 Fall Technical Symposium; Sep. 16, 2003; pp. 1-24.
Alexander Galezewski et al.; "Thermosetting Cellular Elastomers Reinforced with Carbon Black and Silica Nanoparticles"; Journal of Elastomers and Plastics; vol. 33; Jan. 2001; pp. 13-33.
"Polymer Preprints"; Division of Polymer Chemistry, Inc.; American Chemical Society; vol. 42, No. 2; Fall 2001; pp. 885-886.
Michelle Vacatello;"Molecular Arrangements in Polymer-Based Nanocomposites"; Macromol Theory Simul. 2002, 11, No. 7; pp. 757-765.
"Nanomaterials—A Big Market Potential"; Chemical Week; Oct. 16, 2002; pp. 17-20.
"Organic/Inorganic Hybrid Polymer/Clay Nanocomposites"; NASA Tech Briefs; Dec. 2003; p. 21.
Prof. E. P. Giannelis; "Polymer Nanocomposites"; Cornell University; Jan. 17, 2004, p. 1-2.
Siby Varghese et al.; "Rubber Nanocomposites via Solutions and Melt Intercalation"; Presented at a meeting of the Rubber Division, American Chemical Society; Paper No. 43A; Oct. 14-17, 2003; pp. 1-24.
L.A.Goettler et al.; "Layered Silicate Nanocomposites Comprising Rubbery Polymer Matrices"; Presented at a meeting of the Rubber Division, American Chemical Society; Paper No. 41; Oct. 14-17, 2003; 9 pages.
Susmita Sadhu et al.; "Acrylonitrile Butadiene Rubber Based Nanocomposites: Preparation and Mechanical Properties"; Presented at a meeting of the Rubber Division, American Chemical Society: Paper No. 42; Oct. 14-17, 2003; pp. 1-12.
Abhijit Bandyopadhyay et al.;"Synthesis and Characterization of Acrylic Rubber/Silica Nanocomposites by Sol-Gel Technique"; Presented at a meeting of the Rubber Division, American Chemical Society; Paper No. 43; Oct. 14-17, 2003; pp. 1-20.
Liming Dai et al.; "Polymer and Aligned Carbon Nanotube Nanocomposites"; Presented at a meeting of the Rubber Division, American Chemical Society; Paper No. 39; Oct. 14-17, 2003; pp. 1-14.
Arnab Sarkar et al.; "An Analysis of the Microscopic Deformation Field in Rubbers filled with Nano-Particles"; Presented at a meeting of the Rubber Division, American Chemical Society; Paper No. 40; Oct. 14-17, 2003; 17 pages.
Shannon M. Lloyd et al.; "Life cycle Economic and Environmental Implications of Using Nanocomposites in Automobiles"; ACS Publications; Apr. 28, 2003; pp. 3458-3466.
Suprakas Sinha Ray et al.; "New Polylactide/Layered Silicate Nanocomposites"; Macromolecules; Jan. 15, 2002; pp. 3104-3110.
Bo-Hyun Kim et al.; "Nanocomposites of Polyaniline and Na+—Montmorillonite Clay"; Macromolecules; Oct. 10, 2001; pp. 1419-1423.
Joo Young Nam et al.; "Crystallization Behavior and Morphology of Biodegradable Polylactide/Layered Silicate Nanocomposite"; ACS Publications; Jul. 27, 2003; 1 page.
Peter C. LeBaron et al.; "Clay Nanolayer Reinforcement of a Silicone Elastomer"; ACS Publications; Jun. 26, 2001; 1 page.
Christophe Danumah et al.; "Novel Polymer Nanocomposites from Templated Mesostructured Inorganic Materials"; Macromolecules; Apr. 14, 2003; pp. 8208-8209.
Horng-Long Tyan et al.; "Thermally and Mechanically Enhanced Clay/Polyimide Nanocomposite via Reactive Organoclay"; ACS Publications; May 11, 1999; 1 page.
Horn-Long Tyan et al.; "Effect of Reactivity of Organics-Modified Montmorillonite on the Thermal and Mechanical Properties of Montmorillonite/Polymide Nanocomposites"; ACS Publications; Oct. 24, 2000; 1 page.
Jeffrey W. Gilman et al.; "Flammability Properties of Polymer-Layered Silicate Nanocomposites. Polypropylean and Polystyrene Nanocomposites"; ACS Publications; May 8, 2000; 2 pages.
Jeffrey W. Gilman et al.; "Polymer/Layered Silicate Nanocomposites from Thermally Stable Trialkylimidazolium-Treated Montmorillonite"; ACS Publications; Mar. 29, 2002; 1 page.
Benedicte Lepoittevin et al.; "Poly (-caprolactone)/Clay Nanocomposites by In-Situ Intercalative Polymerization Catalyzed by Dibutyltin Dimethoxide"; Macromolecules; Aug. 2, 2002; pp. 8385-8390.
Pascal Viville et al.; "Surface Characterization of Poly (-caprolactone)-Based Nanocomposites"; Langmuir; Jul. 14, 2003; pp. 9425-9433.
Bret J. Chisholm et al.; "Nanocomposites Derived from Sulfonated Poly (butylene terephthalate)"; Macromolecules; Dec. 21, 2001; pp. 5508-5516.
J.E. Mark; "Some Recent Theory, Experiments, and Simulations on Rubberlike Elasticity"; ACS Publications; Aug. 6, 2002; 1 page.
Francis W. Starr et al.; "Molecular Dynamics Simulation of a Polymer Melt with a Nanoscopic Particle"; Macromolecules; Dec. 3, 2001; pp. 4481-4491.
Yuqin Li et al.; "A Differential Scanning Calorimetry Study f the Assembly of Hexadecylamine Molecules in the Nanoscale Confined Space of Silicate Galleries"; ACS Publications; Dec. 21, 2001; 1 page.
Q. H. Zeng et al.; "Molecular Dynamics Simulation of Organic-Inorganic Nanocomposites; Layering Behavior and Interlayer Structure of Organoclays"; ACS Publications; Oct. 6, 2003; 1 page.
S. Joly et al.; "Organizally Modified Layered Silicates as Reinforcing Fillers for Natural Rubber"; ACS Publications; Jun. 14, 2002; 1 page.
Cynthia A. Mitchell et al.; "Dispersion of Functionalized Carbon Nanotubes in Polystyrene"; Macromolecules; Jun. 10, 2002; pp. 8825-8830.
"Buckytube Properties & Uses"; Carbon Nanotechnologies Incorporated; Jan. 17, 2004, 1 page.
"Polymer Benefits"; Nanocor; Dec. 8, 2003, 2 pages.
"Nanoclays for Plastics"; Elementis Specialties; Dec. 8, 2003, 1 page.

"About Bentonite"; Laviosa Chimica Mineraria; Dec. 16, 2003, 1 page.
"Carbon Nanotubes: A Small-Scale Wonder"; Newsfront; Feb. 2003; 2 pages.
Daniel T. Colbert; "Single-wall nanotubes: a new option for conductive plastics and engineering polymers"; Plastics Additives & Compounding; Jan./Feb. 2003; 7 pages.
Tie Lan et al.; "Applications of Nanomer in Nanocomposites: From Concept to Reality"; Nanocor; Jun. 25-27, 2001; 10 pages.
"Hybrid Plastics"; POSS Nanotechnology Conference 2002; Sep. 2002; 58 pages.
Donald Bansleban; "Nanostructured Materials: Commercial Applications and Horizons"; POSS Nanotechnology Conference 2002; Sep. 2002; 1 page.
Rohit Shukla; "California's Nanotechnology Republic"; POSS Nanotechnology Conference 2002; Sep. 2002; 1 page.
Shashi Jasy; "R & D Markets for POSS Nanomaterials"; POSS Nanotechnology Conference 2002; Sep. 2002; 1 page.
Shawn Phillips; "AFRL POSS Applications Research"; POSS Nanotechnology Conference 2002; Sep. 2002; 1 page.
Baudilio Tejerina et al.; "POSS-Versatile Materials for Scientific & Technological Applications"; POSS Nanotechnology Conference 2002; Sep. 2002; 1 page.
John Kieffer; "Multiscale Simulation of POSS Nano-Assembly"; POSS Nanotechnology Conference 2002; Sep. 2002; 1 page.
Erik Abbenhuis; "Homogeneous and Heterogeneous Catalysis with POSS"; POSS Nanotechnology Conference 2002; Sep. 2002; 1 page.
Stephanie L. Wunder et al.;"POSS Materials as Platforms for Synthesis of Novel Electrolytes for Lithium Batteries"; POSS Nanotechnology Conference 2002; Sep. 2002; 1 page.

* cited by examiner

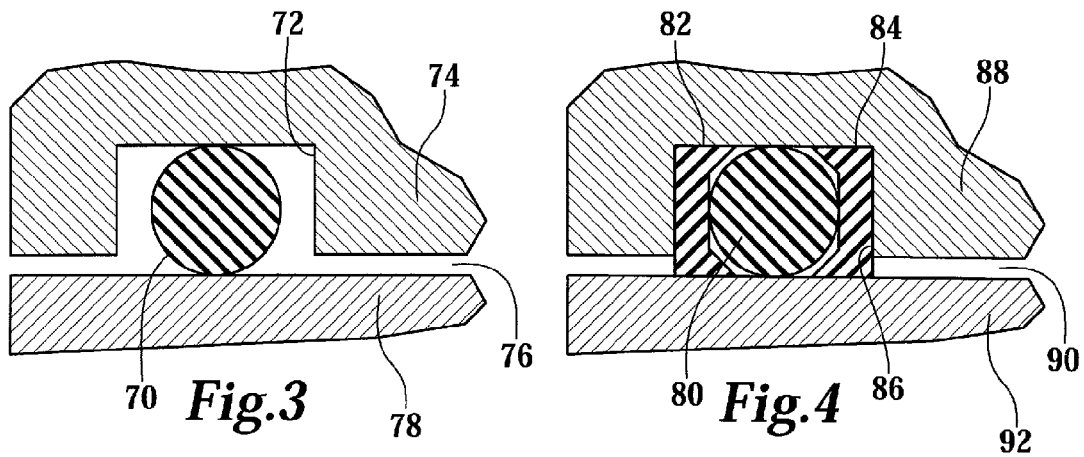
Fig.3
Fig.4
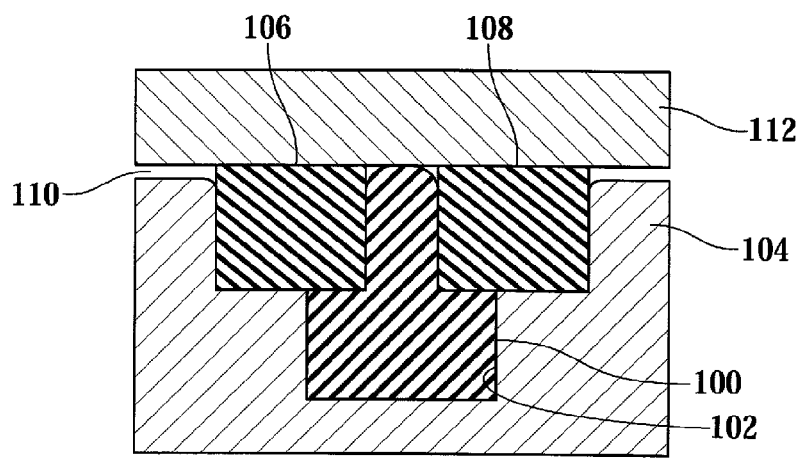
Fig.5
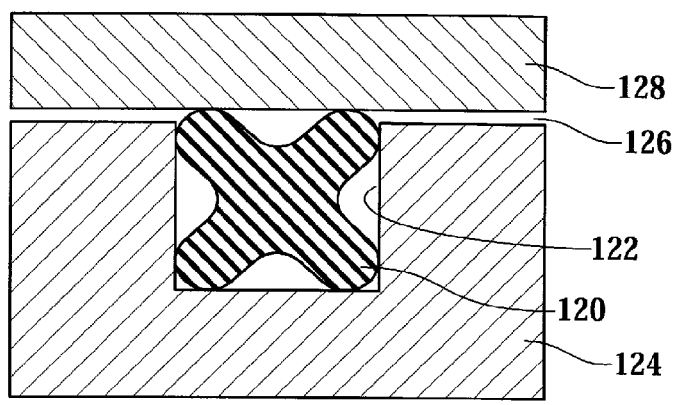
Fig.6

Polysilane resins

Polycarbosilane resins

Polysilsesquioxane resins

PolyPOSS resins

DOWNHOLE SEAL ELEMENT FORMED FROM A NANOCOMPOSITE MATERIAL

CROSS-REFERENCE TO RELATED PATENT APPLICATIONS

This is a continuation application of co-pending application Ser. No. 11/810,323, filed on Jun. 5, 2007, which is a divisional application of application Ser. No. 10/717,814, filed on Nov. 20, 2003, abandoned.

TECHNICAL FIELD OF THE INVENTION

The present invention relates, in general, to a seal element and backup system for use in downhole tools positioned within a wellbore that traverses a subterranean hydrocarbon bearing formation and, in particular, to a downhole seal element formed from a nanocomposite material including a polymer host material and a nanomaterial.

BACKGROUND OF THE INVENTION

Without limiting the scope of the present invention, its background will be described with reference to explosive decompression of static seals, as an example.

A seal is a device used to close a gap or make a joint fluid-tight with respect to both liquids and gases. For example, static seals involve sealing surfaces that do not move relative to one another and dynamic seals involve sealing surfaces that do move relative to one another. In particular, static seals are zero-leakage barriers that provide a long-term complete physical barrier in a potential leakage path to which they are applied. To achieve this, the static seals must be resilient to flow and fill any irregularities in the surface being sealed while resisting extrusion into the clearance gap between the surfaces under full system pressure.

Despite their dependability and reliability, static seals in oil-field equipment can be damaged by explosive decompression when the pressure on the system containing the static seals is released. Seals usually have naturally occurring flaws that are 40 microns or less in size. Under pressure, fluid and gases can enter these voids and reach equilibrium. Moreover, as the pressure decreases, a positive internal pressure in the voids is created that increases the amount of fluid and gases that can enter these voids. If the system containing the static seals is depressurized too rapidly, the liquids and gases that enter these void sites in the static seal can cause damage which is typically exhibited by surface blisters, ruptures and fractures. Internal damage may also accompany the surface damage and occur without external evidence thereof.

The effects of explosive decompression can be minimized by slowly reducing the applied pressure to ambient. For example, the NACE Standard™ 0187-87, Evaluating Elastomeric Materials in Sour Gas Environments, recommends a decompression procedure that includes a bleed-down rate of 20 psi per minute or 100 psi and a waiting period of five minutes before continuing with another pressure reduction of 100 psi. Due to the importance of static seals, solutions to explosive decompression have not been limited to decompression procedures.

The primary structural factors that control a static seal's resistance to explosive decompression are the critical pressure, the flaw size and the shear modulus of the static seal. The critical pressure is the pressure at which the voids in the seal element expand and begin to blister or rupture. The flaw size represents the size of the naturally occurring voids in the static seal. The shear modulus, is a measure of the hardness and cross-link density, i.e., the number of connections between the polymer chains that make up the static seal, of the static seal. The critical pressure and flaw size are inherent properties of the static seal that have proven difficult to improve. Hence, existing static seals have been improved by adding reinforcing seals such as back-up rings. The reinforcing seals have shown themselves to costly and inadequate, however.

Therefore, a need has arisen for a downhole seal element that comprises a material which minimizes the effects of explosive decompression. A need has also arisen for such a downhole seal element that minimizes the critical pressure and the flaw size of the seal element. Further, a need has arisen for such a seal element that has an improved shear modulus.

SUMMARY OF THE INVENTION

Accordingly, the present invention provides a downhole seal element that comprises a material which minimizes the effects of explosive decompression. The downhole seal element of the present invention minimizes the critical pressure and the flaw size of the seal element while improving the shear modulus. The seal element of the present invention overcomes the limitations of the existing seals by utilizing a nanocomposite material comprising a polymer and a nanomaterial.

In one aspect, the present invention is directed to a seal element for providing a seal between two components in a downhole tool. The seal element is formed from a polymer host material having a nanomaterial integrated therewith to form a nanocomposite material. The nanomaterial in combination with the polymer not only minimizes the likelihood of explosive decompression, but also improves a variety of additional seal properties, thereby preventing numerous types of downhole seal failures such as extrusion, spiral failure, abrasion, temperature degradation and the like.

In one embodiment, the seal element of the present invention may be an O-ring seals, D-seals, T-seals, V-seals, X-seals, flat seals, lip seals, back-up rings, bonded seals and packing elements, for example. The polymer host material may comprise an elastomer, a thermoset, a thermoplastic or the like. In particular, the polymer host material may comprise an elastomer such nitrile butadiene (NBR) which is a copolymer of acrylonitrile and butadiene, carboxylated acrylonitrile butadiene (XNBR), hydrogenated acrylonitrile butadiene (HNBR) which is commonly referred to as highly saturated nitrile (HSN), carboxylated hydrogenated acrylonitrile butadiene (XHNBR), hydrogenated carboxylated acrylonitrile butadiene (HXNBR), ethylene propylene (EPR), ethylene propylene diene (EPDM), tetrafluoroethylene and propylene (FEPM), fluorocarbon (FKM), perfluoroelastomer (FEKM) and the like. The polymer host material may be formed from a thermoplastic such as polyphenylene sulfide (PPS), polyetheretherketones such as (PEEK), (PEK) and (PEKK), polytetrafluoroethylene (PTFE) and the like. The polymer host material may be formed from a thermoset such as epoxies and phenolics.

The seal element may further include a reinforcement material such as a powder material, a fiber reinforcement material or a metal reinforcement material. The nanomaterial may be a metal oxide, a nanoclay, a carbon nanostructure or the like and equivalents thereof. The nanomaterial may comprise nanoparticles having a scale in the range of approximately 0.1 nanometer to approximately 500 nanometers. For example, the nanomaterial may be formed from a silicon-based material such as a polysilane resin, a polycarbosilane resin, a polysilsesquioxane resin, a polyhedral oligomeric silsesquioxane resin or the like and equivalents thereof. The polymer host material and the nanomaterial may have interfacial interactions such as copolymerization, crystallization, van der Waals interactions and cross-linking interactions.

In another aspect, the present invention is directed to a downhole tool that has a first component having a groove and a second component positioned relative to the first component forming a gap therebetween. A seal element is positioned in the groove and extends across the gap into sealing contact with the second component. The seal element is formed from a nanocomposite material including a polymer host material and a plurality of nanostructures.

In one embodiment, first component of the downhole tool is stationary relative the second component when the downhole tool is in an operational configuration. In another embodiment, first component and the second component move relative to one another when the downhole tool is in an operational configuration wherein the relative movement is either translational, rotational or both.

In yet another embodiment, the first component and the second component are tubular components. In this embodiment, the first component may be positioned interiorly or exteriorly of the second component. The first and second components may form a portion of a device such as drill bits, mud motors, flow control devices, safety devices, valves, sliding sleeves, telemetry equipment, perforating guns, testing devices and pumps.

In another aspect, the present invention is directed to a seal assembly for providing a seal in a wellbore annulus. The seal assembly has a generally tubular mandrel and a seal element positioned exteriorly of the mandrel such that the seal element is operable to substantially prevent fluid flow in the wellbore annulus when the seal assembly is in a sealing configuration. The seal element comprising a nanocomposite material including a polymer host material and a plurality of nanostructures.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a schematic illustration of an O-ring seal comprising a nanocomposite material in accordance with the teachings of the present invention;

FIG. 4 is a schematic illustration of an O-ring seal with back-up rings comprising a nanocomposite material in accordance with the teachings of the present invention;

FIG. 5 is a schematic illustration of a T-seal comprising a nanocomposite material in accordance with the teachings of the present invention;

FIG. 6 is a schematic illustration of a X-seal comprising a nanocomposite material in accordance with the teachings of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the present invention.

Figure 1:
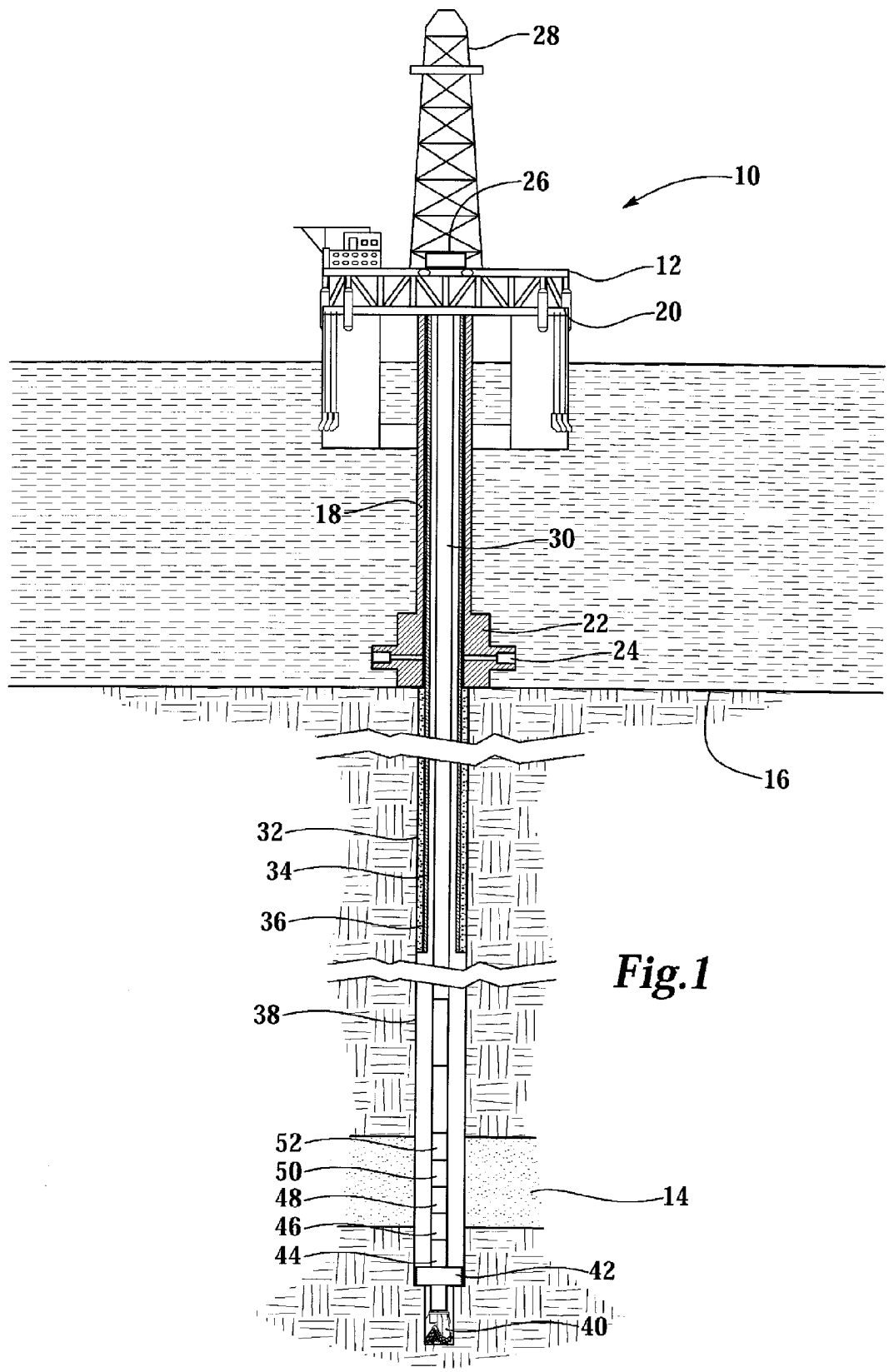
FIG. 1 is a schematic illustration of an offshore oil and gas platform performing completion operations wherein the sealing material of the present invention is advantageously deployed.

Referring initially to FIG. 1, an offshore oil and gas platform performing drilling operations is schematically illustrated and generally designated 10. A semi-submersible platform 12 is centered over a submerged oil and gas formation 14 located below sea floor 16. A subsea conduit 18 extends from deck 20 of platform 12 to wellhead installation 22 including blowout preventers 24. Platform 12 has a hoisting apparatus 26 and a derrick 28 for raising and lowering pipe strings such as drill string 30.

A wellbore 32 extends through the various earth strata including formation 14. A casing 34 is cemented within a portion of wellbore 32 by cement 36. Wellbore 32 has an open hole portion 38 that is being extended in the illustrated embodiment. Specifically, drill string 30 includes a drill bit 40 and a reamer 42 on its downhole end. Drill bit 40 and reamer 42 are being rotated by pumping a fluid through mud motor 44. During the drilling process, the subterranean structures surrounding wellbore may be evaluated using a measurement-while-drilling (MWD) or logging-while-drilling (LWD) tool 46. Information obtained using tool 46 may be sent to the surface via telemetry tool 48 that may transfer information via mud pulses, acoustic waves, electromagnetic waves or the like.

Shortly after drill bit 40 intersects formation 14, drilling may be stopped to allow formation testing before significant mud invasion or filter cake build up occurs. For example, pump assembly 50 may be operated to draw down the formation pressure in formation 14 so that formation fluids can be quickly pumped into formation evaluation tool 52. Formation evaluation tool 52 is used to obtain a representative sample of formation fluid or gather other formation data with a minimum of drilling downtime. Using MWD/LDW tool 46 and formation evaluation tool 52 valuable information can be obtained relating to formation 14 such as permeability, porosity, fluid resistivity, temperature, pressure, bubble point, viscosity and the like.

As should be understood by those skilled in the art, a variety of the tools in drill string 30 utilize polymeric and elastomeric components. For example, drill bit 40 includes a pressure-compensated reservoir that has a lubricant therein that lubricates the bearings between each of the journal pins of drill bit 40 and its respective rotary cutter. An elastomeric diaphragm is positioned within the pressure-compensated reservoir to pressurize the lubricant. In addition, there is an elastomeric seal element positioned between each journal pin and rotary cutter of drill bit 40 that retains the lubricant in the bearing surfaces and prevents fluids from the exterior of drill bit 40 from entering the bearing surfaces.

As another example, mud motor 44 utilizes a stator having an elastomeric inner housing having a plurality of lobes that interact with the spiral wound lobes of the rotor such that when drilling fluid is pumped therethrough, the rotor rotates relative to the stator and imparts rotation to drill bit 40. In addition, mud motor 44 utilizes a plurality of elastomeric seals to retain lubricant in the bearing surfaces and prevent drilling fluids from contacting the bearing surfaces. Likewise, telemetry tool 48, pump assembly 50 formation evaluation tool 52 as well as other tools typically used drilling the drill of a wellbore, either in combination with or instead of the aforementioned tools, utilize polymeric and elastomeric components.

Figure 2:
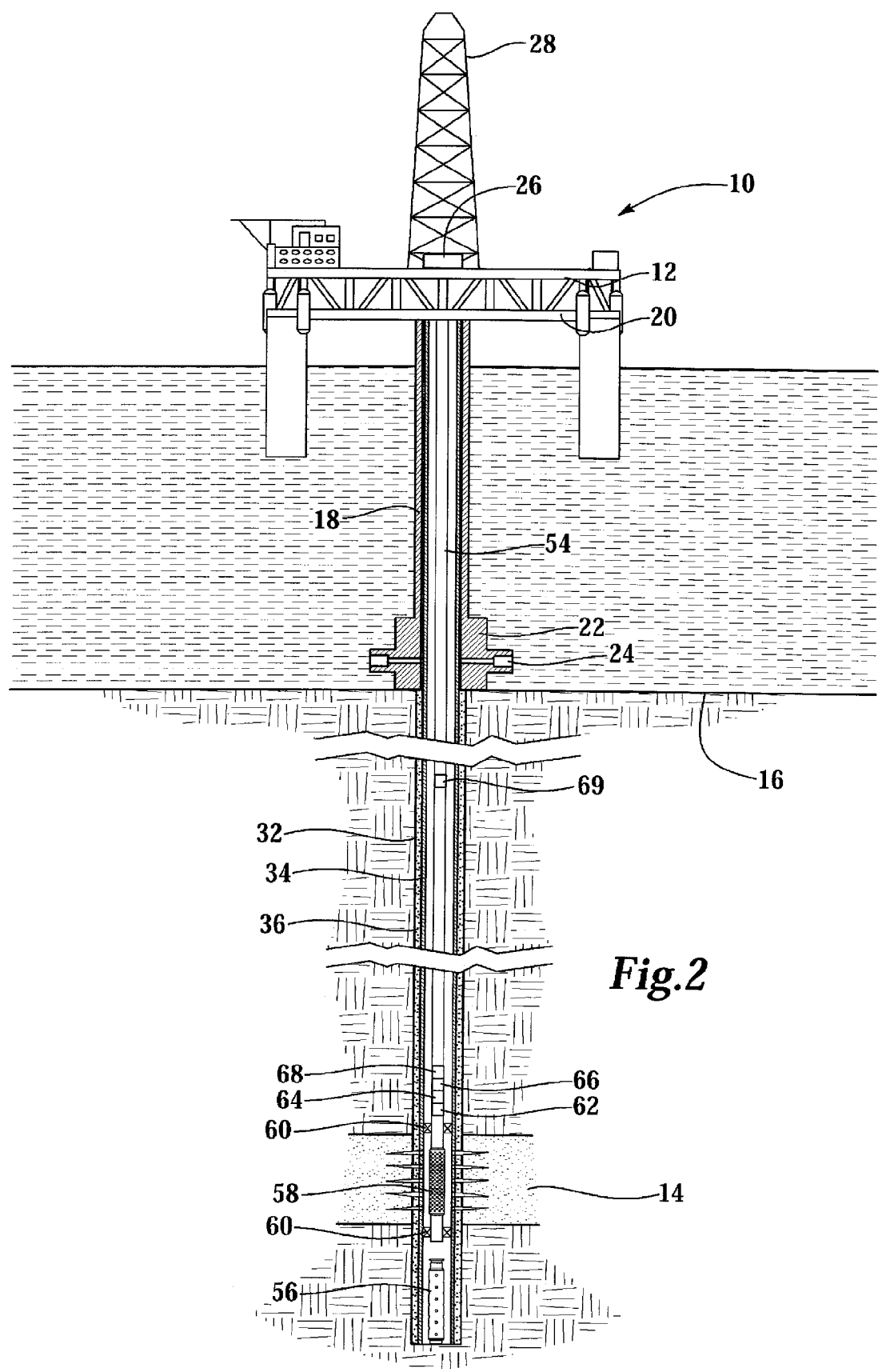
FIG. 2 is a schematic illustration of an offshore oil and gas platform performing production operations wherein the sealing material of the present invention is advantageously deployed.

Referring next to FIG. 2, offshore oil and gas platform 10 is depicted following a completion operation. Specifically, a production tubing string 54 has been installed within wellbore 32 which is now fully cased. In addition, casing 34 has been perforated at formation 14 using perforating guns 56 which have been released into the rat hole of wellbore 32. Production tubing string 54 includes a sand control screen assembly 58 that is positioned between a pair of seal assemblies 60 that isolate production to formation 14. Uphole of sand control screen assembly 58 a fluid loss control valve 62 is positioned that prevents the loss of fluid from within production tubing string 54 to formation 14 during completion operations uphole of formation 14. For example, following a treatment operation within the production interval at formation 14 such as a gravel pack, fracture stimulation, frac pack or the like, a service tool including a variety of tools may be pulled uphole such that a treatment operation may be performed on a formation (not pictured) uphole of formation 14. During this subsequent treatment operation, fluid loss into formation 14 is prevented by fluid loss control valve 62.

Also depicted within production tubing string 54 is a tubing test valve 64 that allows for the periodic pressure testing of production tubing string 54 during installation thereof. Production tubing string 54 also includes a plurality of landing nipples, such as landing nipple 66, which is used to receive, for example, wireline set tools such as permanent and temporary bridge plugs as well as other types of flow control devices. A sliding slide door valve 68 is depicted within production tubing string 54. Sliding slide door valve 68 may be used to selectively permit and prevent fluid communication between the interior of production tubing string 54 and the wellbore annulus. Production tubing string 54 includes one or more subsurface safety valves, such as safety valve 69, that prevent out of control well conditioned from traveling to the surface.

Many of these completion tools and production tools, as well as numerous other downhole tools utilize polymeric and elastomeric components. As an example, perforating gun 56 utilizes numerous seals so that atmospheric pressure can be maintained within the shaped charge carrier. Also, seal assemblies 60 have polymeric and/or elastomeric seal elements that are radially expanded to create a seal between production tubing string 54 and casing 34. Likewise, fluid loss control valve 62, tubing test valve 64, sliding side door valve 68, subsurface safety valve 69, a multi-position gravel packing valve as well as numerous other valving and flow control devices utilize polymeric and/or elastomeric seals between gaps in metal components. Furthermore, polymeric and/or elastomeric seals may be used on devices that are permanently or temporarily positioned with landing nipple 66 such as a bridge plug or other plugging device.

As should be understood by those skilled in the art, numerous downhole tools including those specified above with reference to FIGS. 1 and 2, utilize polymeric and elastomeric seals to provide both static and dynamic sealing between stationary and moving metal components. For example, as seen in FIG. 3, an O-ring seal 70 is positioned within a groove 72 of tubular component 74 and extends across a gap 76 between tubular component 74 and tubular component 78. In this configuration, O-ring seal 70 prevents the passage of fluid pressure through gap 76 from one side of O-ring 70 to the other. It should be noted that O-rings are one of the simplest and most versatile types of seal with a wide range of applications. For example, O-ring seal 70 is suitable for use in downhole tools wherein tubular component 74 and tubular component 78 are stationary relative to one another or wherein tubular component 74 and tubular component 78 move relative to one another in either a translational action, a rotational action or both.

In certain high pressure applications, an O-ring may be susceptible to extrusion into the gap between components. In such situations, as seen in FIG. 4, an O-ring seal 80 may be used on conjunction with one or more back-up rings 84, 86. As illustrated, O-ring seal 80 and back-up rings 82, 84 are positioned within a groove 86 of tubular component 88 and extend across a gap 90 between tubular component 88 and tubular component 92. Together, O-ring seal 80 and back-up rings 82, 84 prevent the passage of fluid pressure through gap 90 from one side of O-ring seal 80 to the other.

In addition to O-ring seals, there are a variety of other types of seals having a wide array of geometries. For example, as seen in FIG. 5, a T-seal 100 is positioned within a groove 102 in tubular component 104. T-seal 100 cooperates with a pair of back-up rings 106, 108 that are positioned within an expanded portion of groove 102. T-seal 100 and back-up rings 106, 108 extend across gap 110 between tubular component 104 and tubular component 112 to provide a seal therebetween. In particular, the arrangement of T-seal 100 and back-up rings 106, 108 is particularly suited for dynamic sealing applications such as moving piston applications since back-up rings 106, 108 have a wide profile that provides support for the leg region of T-seal 100 during piston stroking loads.

As another example, FIG. 6 depicts an X-ring seal 120 positioned within groove 122 of tubular component 124 and extending across gap 126 between tubular component 124 and tubular component 126. X-ring seal 120 may be used in place of an O-ring in a variety of static and dynamic applications. X-ring seal 120 has a 4-lobe configuration such that two sealing areas are created per side as opposed to one sealing area on an O-ring. In addition, X-ring seal 120 requires less squeeze to maintain an effective seal which reduces friction and increasing seal life.

Figure 7:
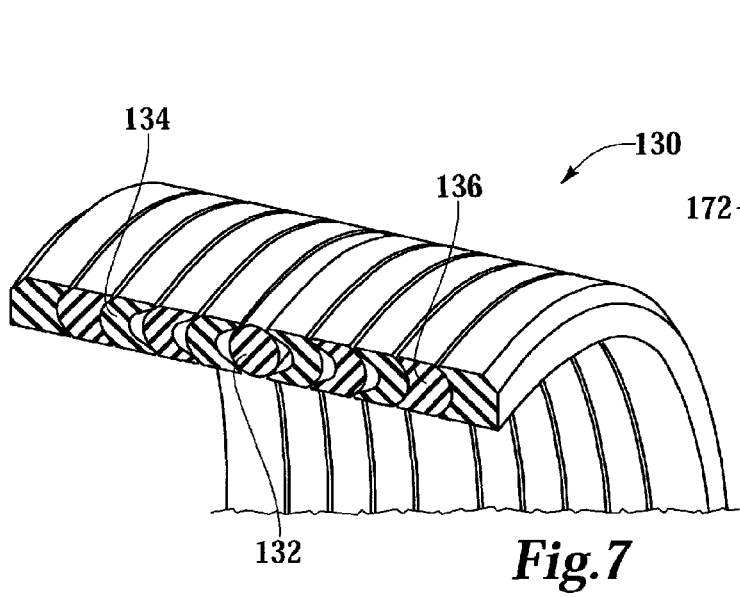
FIG. 7 is a schematic illustration of a V-ring stacking assembly comprising a nanocomposite material in accordance with the teachings of the present invention.

In some applications, a series of seals is desirable to prevent potential leakages. As seen in FIG. 7, a packing stack assembly 130 includes an O-ring 132 in the center having two sets of oppositely facing V-ring stacks 134, 136 each having four V-rings and each having an outer female adaptor. Due to the shape of the V-rings, packing stack assembly 130 provide pressure seals in both directions and have high extrusion resistance allowing packing stack assembly 130 to handle relatively large extrusion gaps. Packing stack assembly 130 is suitable for use in a variety of downhole tools including packer seal units, wireline retrievable locks and safety valves.

While several examples of seal for use in downhole tools have been depicted and discussed herein, the teachings of the present invention are equally applicable to other types of seal having other geometry configurations including, but not limited to, D-rings, U-rings, lip seals, flat seals, symmetric seals, cup seals, wipers or the like and equivalents thereof.

Figure 8:
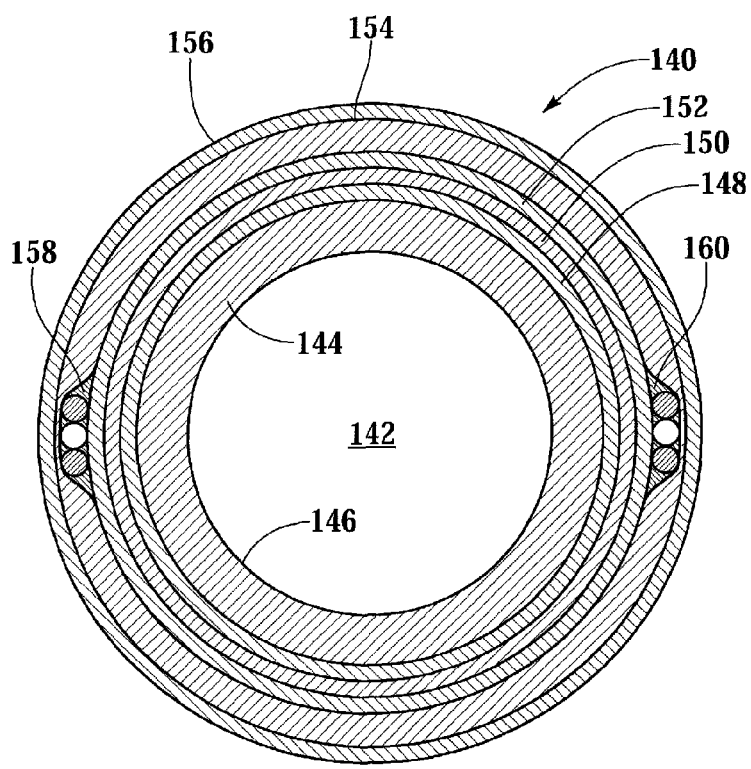
FIG. 8 is a cross-sectional view of a section of composite coiled tubing comprising a nanocomposite material in accordance with the teachings of the present invention.

As should be understood by those skilled in the art, numerous downhole tools utilize polymeric and elastomeric materials in function other than seals. For example, FIG. 8 depicts a section of composite coiled tubing 140 that includes an inner fluid passageway 142 defined by an inner thermoplastic liner 144 that provides a body upon which to construct the composite coiled tubing 104 and that provides a relative smooth interior bore 146. Fluid passageway 142 provides a conduit for transporting fluids such as production fluids, hydraulic fluid, treatment fluids/slurries and the like. Layers of braided or filament wound material such as Kevlar or carbon encapsulated in a matrix material such as epoxy surround liner 144 forming a plurality of generally cylindrical layers, such as layers 148, 150, 152, 154 and 156 of composite coiled tubing 140. A pair of oppositely disposed inner areas 158, 160 are formed within composite coiled tubing 140 between layers 152 and 154 by placing layered strips of carbon or other stiff material therebetween. Inner areas 158, 160 have conduits that may be employed for a variety of purposes, such as running power lines, control lines, communication lines or the like.

Figure 9:
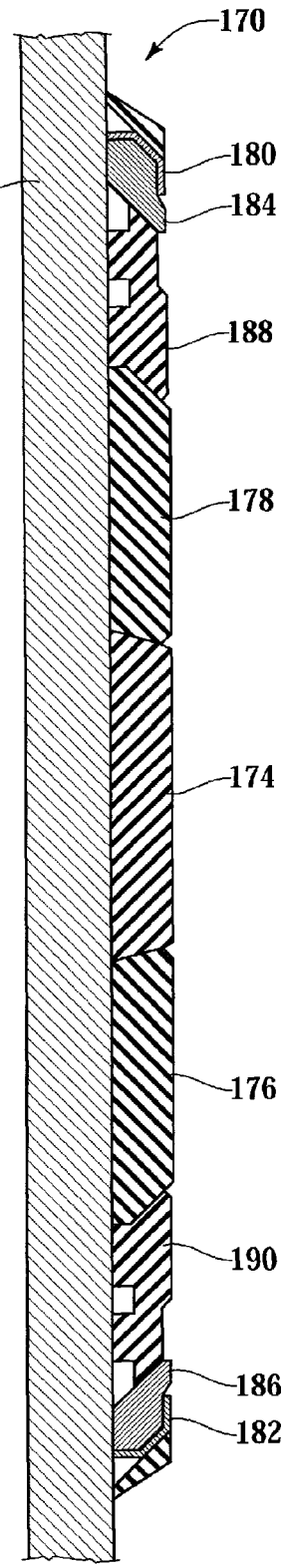
FIG. 9 is a schematic illustration of a packing mandrel comprising a nanocomposite material in accordance with the teachings of the present invention.

As another example, FIG. 9 depicts a seal assembly 170 that may be used to provide a seal between a production tubing string and a casing string or open hole of a wellbore as discussed above with reference to FIG. 2. Seal assembly 170 includes a mandrel 172 that provides structural support for the various seal elements and provides an inside passageway for fluid flow. Mandrel 172 may be formed from a metal such as carbon steel, a composite material such as that discussed above with reference to FIG. 8, or a polymeric material such as a thermoplastic. Seal assembly 170 includes a center element 174 that is a soft elastomeric element which provides the primary seal and is the first to deform and contact both the mandrel and casing during setting operations. Once center element 174 compresses, end elements 176, 178 begin to energize and expand out into contact with the casing. As such, center element 174 and end elements 176, 178 combine to seal the annular space between packing mandrel 172 and the casing. Respective wire meshs 180, 182, brass back-up shoes 184, 186 and elastomeric back-up shoes 186, 188 provide an anti-extrusion system.

Figure 10:
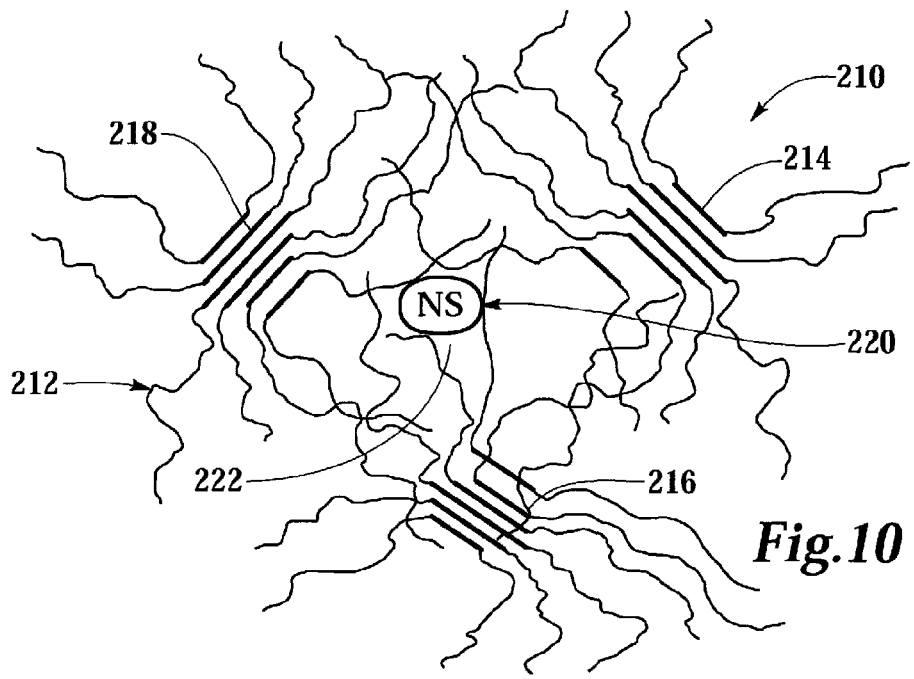
FIG. 10 is a nanoscopic view of a nanocomposite material including a polymer host material and a nanostructure used in a downhole tool in accordance with the teachings of the present invention.

Each of the elastomeric or polymeric components for downhole tools discussed above as well as equivalents thereof can be formed from a nanocomposite material of the present invention to improve various properties of the material and enhance the useful life of the nanocomposite components and therefore the useful life of the downhole tools. FIG. 10 depicts a nanoscopic view of a nanocomposite material 210 for use in downhole tools. Nanocomposite material 210 is formed from a polymer host material 212 that includes multiple polymers, such as polymers 214, 216, 218 and a plurality of nanostructures such as the depicted nanostructure 220. Polymer host material 212 exhibits microporosity as represented by a plurality of regions of free volume, such as region 222. In the illustrated embodiment, nanostructure 220 is positioned within free volume region 222.

Nanostructure 220 structurally and chemically complements the microporosity of polymer host material 212. More specifically, as nanostructure 220 has a greater surface area than polymer host material 212, due to the nano-size and nano-volume of nanostructure 220, nanostructure 220 is integrated with polymer host material 212 and forms interfacial interactions with polymer host material 212 at region 222. The interfacial interactions, including copolymerization, crystallization, van der Waals interactions and cross-linking interactions, are formed between nanostructure 220 and multiple polymers 214, 216, 218 to not only improve the tensile strength, compression set and temperature stability of polymer host material 212, but also the extrusion resistance, explosive decompression resistance and abrasion resistance of host polymer material 212, thereby resulting in an extended life for the diaphragms, seal elements, packing element and other downhole component that are formed from nanocomposite material 210 of the present invention.

Polymer host 212 may comprise any combination of elastomers, thermosets and thermoplastics, for example. Elastomers are thermoset materials commonly referred to as rubbers. In particular, elastomers are polymeric materials that over a range of temperatures are capable of recovering substantially in shape and size after removal of a deforming force.

More specifically, polymer host 212 may be formed from a nitrile elastomer such as nitrile butadiene (NBR) which is a copolymer of acrylonitrile and butadiene, carboxylated acrylonitrile butadiene (XNBR), hydrogenated acrylonitrile butadiene (HNBR) which is commonly referred to as highly saturated nitrile (HSN), carboxylated hydrogenated acrylonitrile butadiene and the like. Polymer host 212 may also be formed from other elastomers such as ethylene propylene (EPR), ethylene propylene diene (EPDM), tetrafluoroethylene and propylene (FEPM), fluorocarbon (FKM), perfluoroelastomer (FEKM) or the like and equivalents thereof.

For example, the use of an HSN elastomer provides polymer host 212 with the properties of elasticity, good chemical resistance, high mechanical strength and good resistance to abrasion at elevated temperatures as well as a low coefficient of friction and excellent wear resistance. As compared with standard nitrile elastomers, HSN elastomers are hydrogenated to reduce the number of carbon-carbon double bonds. The hydrogenation process preferable eliminates between about 90% and 99.5% of the double bonds in the nitrile. The removal of the carbon-carbon double bonds reduces the reaction of agents such as hydrocarbons, oxygen, hydrogen sulfide and ozone with the elastomer. Attack by such agents can reduce the tensile strength, elongation and compression set resistance of the elastomer composition.

Thermosets refer to non-elastomeric cross-linked materials that become stiff and strong when processed with the aid of a curing agent and heat. Phenolics and 2-part epoxies, fall under this category, for example. Thermoplastic materials are commonly known as plastics because of their relative hardness when compared to elastomers. Typically, thermoplastics are made of long polymer molecules that deform under thermal expansion but have a limited amount of elastic recovery. Thermoplastic materials are typically produced by sintering or melt processing under temperature and pressure. Thermoplastics include polyetheretherketones such as (PEEK), (PEK) and (PEKK), polphenylene sulfide (PPS), polytetrafluoroethylene (Teflon®) and the like.

For example, the use of PEEK provides polymer host 212 with the properties of a high performance semi-crystalline engineering thermoplastic. As compared with standard thermoplastics, PEEK thermoplastics are acceptable for an extremely wide range of applications where good thermal and chemical properties are essential. In particular, PEEK thermoplastics exhibit compatibility with acids (HCl/HF), bases, and both alphatic and aromatic hydrocarbons. Hence, PEEK thermoplastics may be employed in downhole environments that may have caustic chemicals or high-temperature aqueous solutions.

Nanostructure 220 comprises nanoparticles having a scale in the range of approximately 0.1 nanometers to approximately 500 nanometers. Nanostructure 220 may be formed by a process including sol-gel synthesis, inert gas condensation, mechanical alloying, high-energy ball milling, plasma synthesis, electrodeposition or the like. Nanostructures 220 may include metal oxides, nanoclays, carbon nanostructures and the like.

Metal oxide nanoparticles include oxides of zinc, iron, titanium, magnesium, silicon, aluminum, cerium, zirconium or the like and equivalents thereof, as well as mixed metal compounds such as indium-tin and the like. In one embodiment, a plasma process is utilized to form metal oxide nanoparticles having a narrow size distribution, nonporous structures and nearly spherical shapes. Nanoclays are naturally occurring, plate-like clay particles such as montmorillonite (MMT) nanoclay. In one embodiment, the nanoclays are exfoliated in the polymer host via a plastic extrusion process. Carbon nanostructures include carbon nanotubes, carbon nanofibers (CNF), nanocarbon blacks and calcium carbonates.

Figure 11:
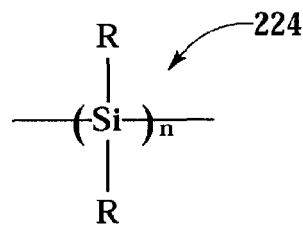
FIG. 11 depicts the structural formula of one embodiment of a silicon-based nanostructure used in a downhole tool in accordance with the teachings of the present invention.
Figure 12:
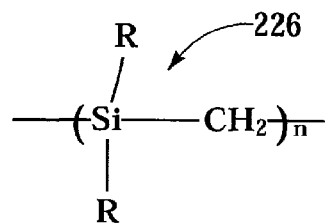
FIG. 12 depicts the structural formula of a second embodiment of a silicon-based nanostructure used in a downhole tool in accordance with the teachings of the present invention.
Figure 13:
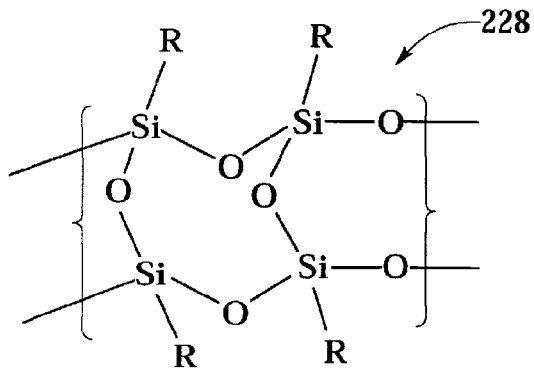
FIG. 13 depicts the structural formula of a third embodiment of a silicon-based nanostructure used in a downhole tool in accordance with the teachings of the present invention.
Figure 14:
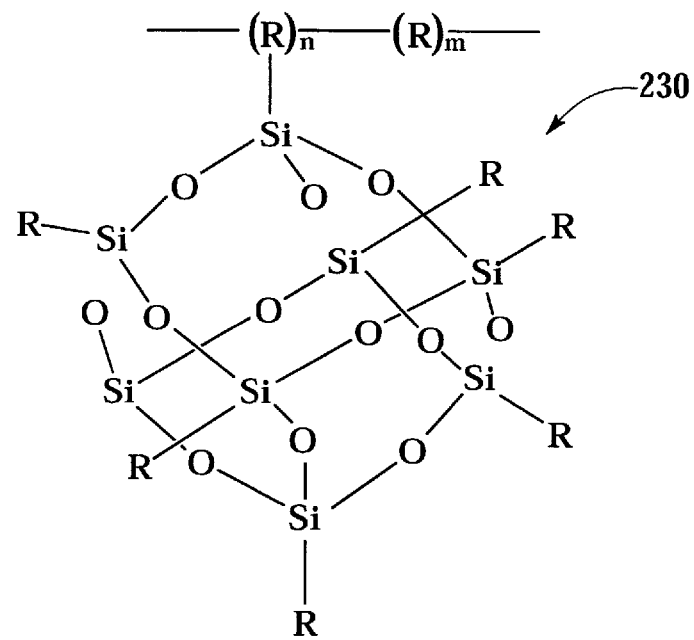
FIG. 14 depicts the structural formula of a fourth embodiment of a silicon-based nanostructure used in a downhole tool in accordance with the teachings of the present invention.

In one embodiment, nanostructure 220 may be formed from polysilane resins (PS) 224, as depicted in FIG. 11, polycarbosilane resins (PCS) 226, as depicted in FIG. 12, polysilsesquioxane resins (PSS) 228, as depicted in FIG. 13, or polyhedral oligomeric silsesquioxane resins (POSS) 230, as depicted in FIG. 14, as well as monomers, polymers and copolymers thereof or the like and equivalents thereof. In the formulas presented in FIGS. 11-14, R represents a hydrogen or an alkane, alkenyl or alkynl hydrocarbons, cyclic or linear, with 1-28 carbon atoms, substituted hydrocarbons R—X, aromatics Ar and substituted aromatics Ar—X where X represents halogen, phosphorus or nitrogen containing groups. The incorporation of halogen or other inorganic groups such as phosphates and amines directly into onto these nanoparticles can afford additional improvements to the mechanical properties of the material. For example, the incorporation of halogen group can afford additional heat resistance to the material. These nanostructures may also include termination points, i.e., chain ends, that contain reactive or nonreactive functionalities such as silanols, esters, alcohols, amines or other R groups.

Preferably, nanostructures 220 are integrated with polymer host material 212 prior to curing. In one embodiment, nanostructures 220 are integrated into polymer host material 212 by adding or blending nanostructures 220 in a preceramic state with polymer host material 212 such that when nanostructures 220 are heated above their decomposition point, nanostructures 220 convert into a ceramic. Alternatively, nanostructures 220 may be integrated with polymer host material 212 after curing using a deposition process such as spraying.

Figure 15:
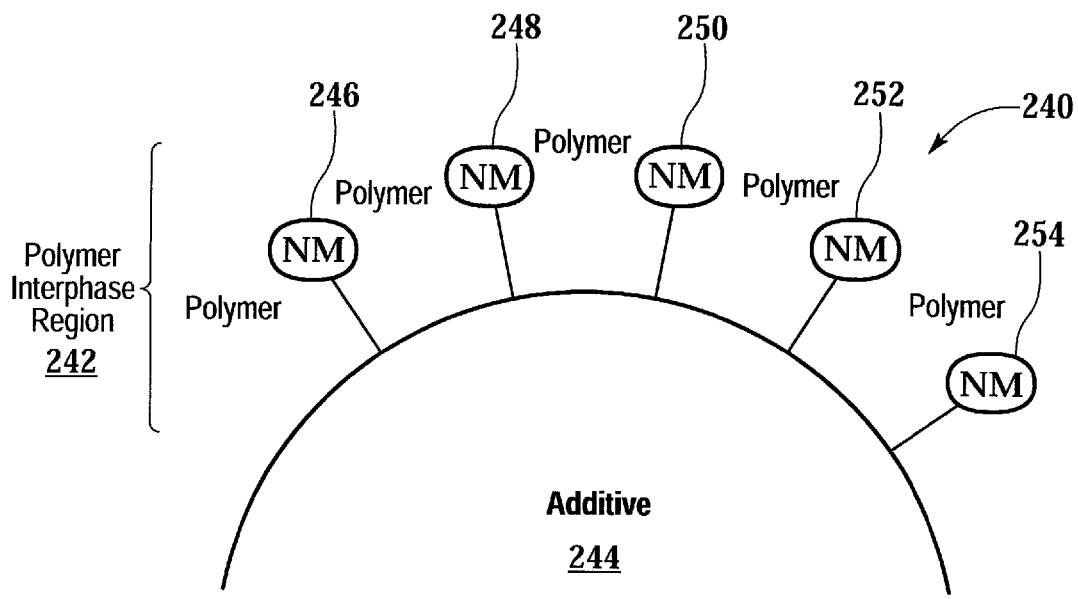
FIG. 15 is a nanoscopic view of a nanocomposite material including a polymer host material, a plurality of nanostructures and an additive used in a downhole tool in accordance with the teachings of the present invention.

Referring next to FIG. 15, a nanocomposite material for use in a downhole environment in accordance with the teachings of the present invention is nanoscopically depicted and generally designated 240. One or more additives may be compounded or mixed with the base polymer to modify and enhance desirable properties. For example, a seal element of the present invention may preferably be formed from an elastomeric material that is produced by a curing method that involves compounding or mixing the base polymer with various additive or agents such as graphite, a peroxide curing agent, furnace black, zinc oxide, magnesium oxide, antioxidants, accelerators, plasticizers, processing aids or the like and combinations thereof which modify various properties of the base polymer.

Use of nanostructures in combination with these additives can further enhance desirable properties. As illustrated, a polymer interphase region 242 is defined by polymer host material. An additive 244 is associated with polymer interphase region 242. Nanomaterials 246-254 stabilize and reinforce interphase region 242 of nanocomposite 240 and, in particular, nanomaterials 246-254 reinforce the polymers and complement additive 244 by strengthening the bonding between the polymers and additive 244.

Additive 244 extends the performance envelope and lifetimes of the polymer material by providing strength to the nanocomposite matrix while preserving the desirable qualities of the nanocomposite. While the additives listed hereinbelow tend to improve certain properties when compounded or mixed with the base polymer of nanocomposite 210, the improvement in one property tends to be counteracted by a reduction in the performance envelope of another property. For example, compounding the base polymer with an additive may result in an increase in the temperature stability of the base polymer but may also result in a reduction in the abrasion resistance of the base polymer or vice versa. Nanocomposite material 240 of the present invention, however, overcomes these property trade off problems by integrating the aforementioned nanomaterials into the base polymer either instead of or in addition to other additives.

Many additives such as powder fillers, fibers, and metals can be used. Powder fillers can be used to drive the total material cost down or to add structural integrity to the material. For example, carbon black is often used as a mechanical reinforcement to improve the strength, stiffness, wear resistance, UV and ozone degradation resistance, and liquid absorption resistance of polymers and in particular, elastomers. The strength can be increased up to 10 times with the addition of carbon black. The structure of carbon black results in isotropic properties and also allows it to bond very well with polymers. Silica powders are also used to reinforce elastomers, add strength and stiffness, and add color. Silicone rubber is commonly made with silica fillers.

In addition, polymers can be reinforced with a variety of fibers, such as fiberglass, asbestos (obsolete), oriented polymer fibers, and (e.g., Kevlar), for example, to improve the mechanical performance of materials. These fibers can increase the strength, toughness, extrusion resistance, and wear resistance of elastomers while decreasing the ultimate elongation. Metal reinforcements can be in the form of wires, rings, springs, and tubes. Metal reinforcements provide a great deal of structural integrity but can be difficult to bond to some elastomers. In this respect, particular nanomaterials can be employed to bond the polymer to the metal reinforcements in order to increase the strength of the polymer.

As previously alluded to, nanomaterials prevent material failures, such as seal failures, by strengthening the bonding within a polymer and between a polymer and a reinforcer such as a macroscopic reinforcer. By way of example, nanocomposites prevent explosive decompression and the hardening, cracking and softening that occurs to seals over time. Nanomaterials are small enough to fill the voids that liquids and gases enter. Moreover, nanomaterials create strong bonds with the polymer host within these voids. This prevents explosive decompression and the hardening, cracking and softening caused by corrosive chemicals.

By way of another example, nanomaterials minimize extrusion, nibbling, spiral failures and abrasion, for example. Extrusion and nibbling can occur due to cyclic pressure loading. Extrusion occurs when differential pressure across a seal forces material into an existing extrusion gap between tool components. Spiral failure usually occurs with O-rings that have a long stroke length. Some parts of the ring will slide while other parts roll and are sliced by the edge of the O-ring groove. Abrasion is a common problem with rotary seals or with seals that involve long stroke lengths. Seals can also be abraded while running into or pulling out of the hole if wear ring are not used. With respect to each of these failures the interactions that the nanomaterial forms with the polymer maintain the chemical bonds within the polymer and prevent extrusion, nibbling, spiral failures, and abrasion, which are caused by the decoupling and breaking of bonds within the polymer.

By way of further example, in existing polymers, over time an elastomer becomes stretched and begins to permanently deform into its new shape. This time dependent lack of elastic recovery can be accelerated with increased temperature and is commonly referred to as compression set. The stiffness is controlled by the crosslink density and increases as the crosslink density increases. As nanomaterials increase the crosslinking density, nanomaterials can extend the life of elastomers significantly.

EXAMPLE

The mechanical properties, such as tensile strength, elongation, and Young's modulus, for example, of the nanocomposite can be tailored over a wide range for the specific downhole conditions by varying the amount and type of nanostructure incorporated into the polymer host. By way of example, the following table illustrates particular nanostructures integrated into a polymer host by adding or blending the nanostructure in a preceramic state with the polymer host such that the nanostructure when heated above its decomposition point converts into a ceramic. The polymer host used in this example is a polyether block-polyamide copolymer (PEBAX), i.e., a thermoplastic. It should be appreciated however, that similar results would be achieved with other thermoplastics such as polypropylene, polyolefins, nylons, polyethers, polyesters, styrene-butadiene-styrere triblocks, and the like.

TABLE 1

| Materials (% weight) | Peek Stress (psi) | Breaking Stress (in/in) | Young's Modulus (psi) | Melting Temperature (° C.) |
| --- | --- | --- | --- | --- |
| PEBAX/PCS 80/20 | 2313 | 7.0 | 1894 | 118 |
| PEBAX/PS 80/20 | 2210 | 9.4 | 74 | 118 |
| PEBAX/PS 50/50 | 448 | 3.8 | 2253 | 110 |
| PEBAX 100 | 2778 | 8.2 | 617 | 119 |

As illustrated in Table 1, the mechanical properties of the PEBAX material may be greatly improved by the addition of a nanostructure such as PS 224 or PCS 226. Specifically, the addition of 20% by weight of PCS 226 to the PEBAX approximately triples the Young's Modulus of the PEBAX while maintaining approximately the same breaking stress and melting temperature. Similarly, the addition of 20% by weight of PS 224 to the PEBAX increases the breaking stress. Moreover, the addition of 50% by weight of PS 224 dramatically increases the Young's modulus.

By way of another example, the nanostructure phenylsilicon improves the stability and heat resistance of polyphenylene ether. In particular, the functionalized epoxy group of the polyphenylene ether reacts with the amino group of the silicon nanostructure to form a nanocomposite that demonstrates improved stability and heat resistance.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A downhole tool system comprising:
a first downhole component;
a second downhole component positioned relative to the first downhole component; and
a seal element positioned between and in sealing contact with the first and second downhole components, the seal element comprising a nanocomposite material including a polymer host material and a nanomaterial that includes chemically functionalized carbon nanotubes.

2. The downhole tool system as recited in claim 1 wherein the nanomaterial has a dimension in the range of approximately 0.1 nanometer to approximately 500 nanometers.

3. The downhole tool system as recited in claim 1 wherein the seal element comprises a seal selected from the group consisting of O-ring seals, D-seals, T-seals, V-seals, X-seals, flat seals, lip seals, back-up rings, bonded seals and packing elements.

4. The downhole tool system as recited in claim 1 wherein the polymer host material and the nanomaterial have interfacial interactions.

5. The downhole tool system as recited in claim 1 wherein the nanomaterial structurally complements the polymer host material.

6. The downhole tool system as recited in claim 1 wherein the nanomaterial chemically complements the polymer host material.

7. A downhole tool system comprising:
a first downhole component;
a second downhole component positioned relative to the first downhole component; and
a seal element positioned between and in sealing contact with the first and second downhole components, the seal element comprising a nanocomposite material including an elastomer host material and a nanomaterial that includes chemically functionalized nanotubes.

8. The downhole tool system as recited in claim 7 wherein the elastomer host material further comprises a copolymer of acrylonitrile and butadiene.

9. The downhole tool system as recited in claim 7 wherein the elastomer host material is selected from the group consisting of acrylonitrile butadiene, carboxylated acrylonitrile butadiene, hydrogenated acrylonitrile butadiene, highly saturated nitrile, carboxylated hydrogenated acrylonitrile butadiene, hydrogenated carboxylated acrylonitrile butadiene, ethylene propylene, ethylene propylene diene, tetrafluoroethylene and propylene, fluorocarbon and perfluorocarbon.

10. The downhole tool system as recited in claim 7 wherein the nanomaterial has a dimension in the range of approximately 0.1 nanometer to approximately 500 nanometers.

11. The downhole tool system as recited in claim 7 wherein the seal element comprises a seal selected from the group consisting of O-ring seals, D-seals, T-seals, V-seals, X-seals, flat seals, lip seals, back-up rings, bonded seals and packing elements.

12. The downhole tool system as recited in claim 7 wherein the elastomer host material and the nanomaterial have interfacial interactions.

13. The downhole tool system as recited in claim 7 wherein the nanomaterial structurally complements the elastomer host material.

14. The downhole tool system as recited in claim 7 wherein the nanomaterial chemically complements the elastomer host material.

15. A downhole tool system comprising:
   a downhole component positioned relative to a downhole surface; and
   a seal element positioned between and in sealing contact with the downhole component and the downhole surface, the seal element comprising a nanocomposite material including an elastomer host material and a nanomaterial that includes at least one of chemically functionalized carbon nanotubes and chemically functionalized carbon nanofibers.

16. The downhole tool system as recited in claim 15 wherein the elastomer host material further comprises a copolymer of acrylonitrile and butadiene.

17. The downhole tool system as recited in claim 15 wherein the elastomer host material is selected from the group consisting of acrylonitrile butadiene, carboxylated acrylonitrile butadiene, hydrogenated acrylonitrile butadiene, highly saturated nitrile, carboxylated hydrogenated acrylonitrile butadiene, hydrogenated carboxylated acrylonitrile butadiene, ethylene propylene, ethylene propylene diene, tetrafluoroethylene and propylene, fluorocarbon and perfluorocarbon.

18. The downhole tool system as recited in claim 15 wherein the nanomaterial has a dimension in the range of approximately 0.1 nanometer to approximately 500 nanometers.

19. The downhole tool system as recited in claim 15 wherein the seal element comprises a seal selected from the group consisting of O-ring seals, D-seals, T-seals, V-seals, X-seals, flat seals, lip seals, back-up rings, bonded seals and packing elements.

20. The downhole tool system as recited in claim 15 wherein the elastomer host material and the nanomaterial have interfacial interactions.

21. The downhole tool system as recited in claim 15 wherein the nanomaterial structurally complements the elastomer host material.

22. The downhole tool system as recited in claim 15 wherein the nanomaterial chemically complements the elastomer host material.

23. The downhole tool system as recited in claim 15 wherein the downhole surface further comprises a wellbore surface.

24. The downhole tool system as recited in claim 23 wherein the wellbore surface further comprises an open hole wellbore surface.

25. The downhole tool system as recited in claim 15 wherein the downhole surface further comprises a tubular string surface.

* * * * *